(No Model.)
T. MILLER.
WHEEL FOR TRAM CARS, &c.
No. 554,523. Patented Feb. 11, 1896.
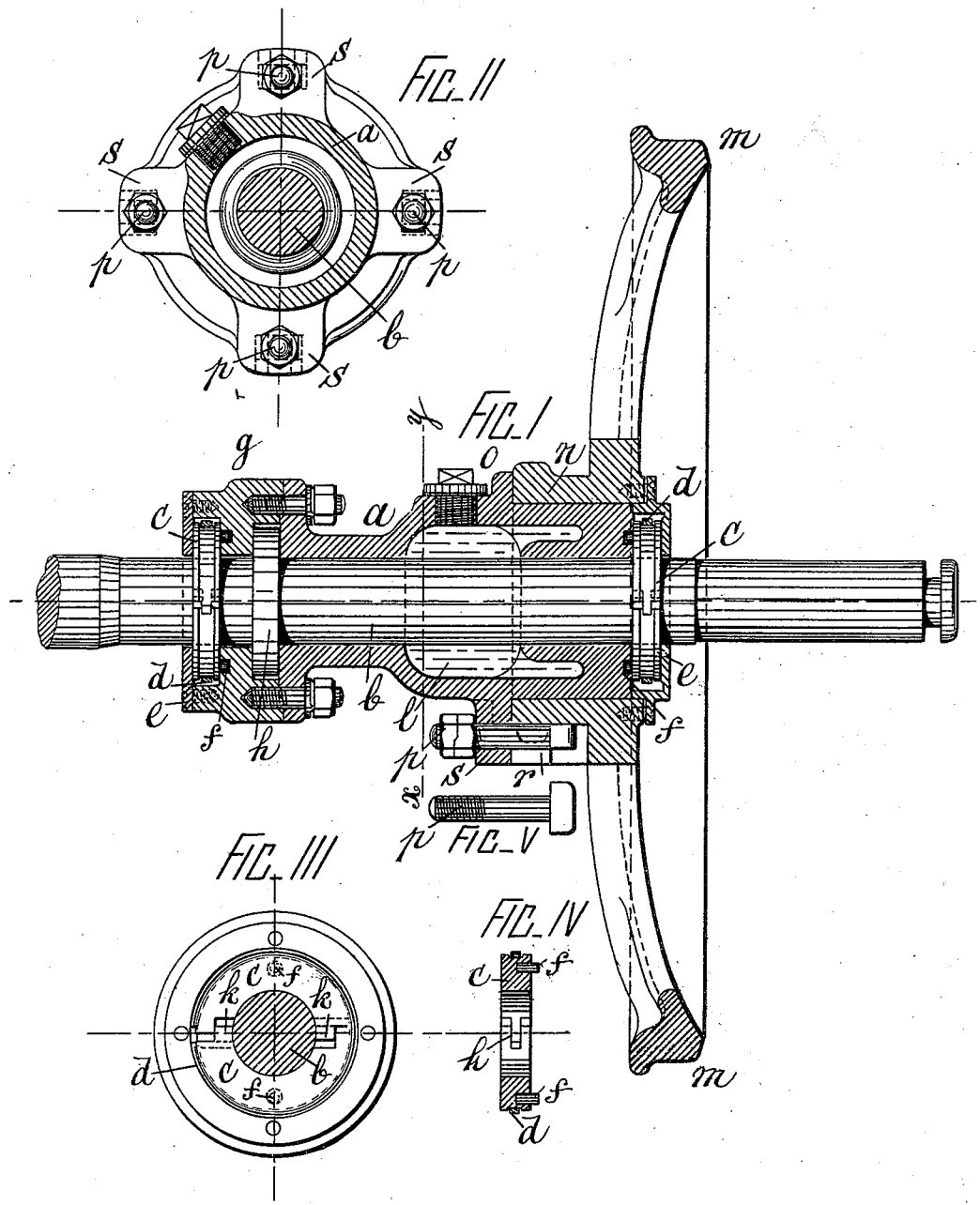
Witnesses:
John C. Wilson
J. S. Giusta
Inventor:
Thomas Miller,
by Whitman & Wilkinson
Attys.

UNITED STATES PATENT OFFICE.

THOMAS MILLER, OF EDINBURGH, SCOTLAND.

WHEEL FOR TRAM-CARS, &c.

SPECIFICATION forming part of Letters Patent No. 554,523, dated February 11, 1896.

Application filed November 4, 1895. Serial No. 567,888. (No model.) Patented in England March 10, 1893, No. 5,252.

*To all whom it may concern:*

Be it known that I, THOMAS MILLER, a subject of the Queen of Great Britain, residing at Edinburgh, Scotland, have invented a new and useful Improvement in Wheels for Tram-Cars, Railway-Carriages, and Similar Vehicles Running Loose upon their Axles, and in Dust-Excluding Devices for the Same, (for which I have obtained a patent in Great Britain, numbered 5,252, and bearing date March 10, 1893,) of which the following is a specification.

My invention relates to improvements in the wheels of tram-cars, railway-carriages, and other vehicles which run loose upon the axle and are fitted with devices by which dust is excluded from the working parts of the wheel and axle.

The objects of my improvement are, first, to more perfectly exclude the dust, so that the wheel and axle are rendered very durable, and, second, to enable the tire and outer part of the wheel to be removed when worn out, from the center which carries the dust-excluding devices and a fresh tire and outer part to be substituted. I attain these objects by the method illustrated in the accompanying drawings, in which—

Figure 1 is a vertical section through a wheel and my improved boss and dust-excluding device. Fig. 2 is a transverse section through the line $xy$, Fig. 1. Fig. 3 is a front view, and Fig. 4 a vertical section, showing the dust-excluding device. Fig. 5 is a separate view of the T-headed bolts by which the separate tire is fixed upon the central part of the wheel which carries the dust-excluding devices.

Similar letters refer to similar parts throughout the several views.

The metallic dust-excluder consists of a ring $c$ made of antifriction or other suitable metal, such as what is known as "Babbitt" metal, and it is composed of two or more segments held together by a metallic spring or springs $d$, the joints of these segments where their ends meet being so formed, as shown at $k$, where their ends are shown recessed into each other, as to totally exclude the dust from the bearing or wearing part $a$ of the loose wheel and of the axle $b$, and yet be capable of sliding or coming together in order to compensate for wear.

No india-rubber washers or other packing are necessary.

The metallic ring or dust-excluder $c$ is so constructed therefore as to maintain a close fit round the axle when any wear between the inside of the ring and axle takes place. It is also made to revolve with the wheel round the axle by means of a pin $f$ fixed in each of its segments, and fitting into a slot cut radially in the corresponding face it fits against.

A dust-excluding ring $c$ is arranged at the front or outside of the wheel, and a second one at the inner end of the tubular boss $a$, which fits upon the axle. $h$ is a flange upon the axle embraced between a flange upon the boss $a$ and a separate flange $g$ bolted to it.

Each complete ring $c$ is made to fit and slide between two turned parallel faces. The ring at the front of the wheel fits between the face of the boss and a turned metal plate $e$ screwed to it, and the ring at the back of the wheel between a turned face upon the loose flange $g$ and a similar turned metal plate $e$ bolted to it.

Upon the long boss $a$ there is formed a large oil-reservoir, as shown at $l$. This reservoir, when once filled with good lubricating-oil, will run without attention during the life of the wheel. The reservoir may be without opening or plug, solidified oil being filled into it at the time of fitting up.

By means of the pins $f$ fixed into each segment of the dust-excluder $c$ and fitting into slots in the corresponding faces against which they fit, the dust-excluder $c$ is caused to revolve on the axle with the wheel, and consequently no wear can take place upon its sides, the only wear being on the inside edge which is in contact with the axle, and this wear being constantly taken up by means of the metallic spring $d$.

The tire $m$ and body of the wheel are made entirely distinct and separate from the long boss $a$ which fits and turns upon the axle $b$ and carries the dust-excluding devices described, and the outer end of the boss $a$ is turned truly cylindrical and upon it is fitted a corresponding bored socket n fixed upon the center of the wheel itself, from which it projects inward and bears against the turned face of the boss a. Upon the long boss a which receives the wheel-socket n, as described, a flange o is made against which the inner end of the socket n, or of a flange upon the latter, abuts, and the two are attached together by a sufficient number of bolts or studs p. Four such bolts are shown in the drawings provided with T-heads (see Fig. 5) which fit in recesses formed behind brackets r projecting from the boss n, these brackets being open at their outer ends so that the bolts can be readily introduced and withdrawn. Similar brackets s having holes for the bolts p are formed upon the boss a.

In order to fit on a new wheel-tire it is only necessary to unscrew the nuts from the bolts or studs p last described and draw the wheel-socket n and wheel m off the central boss a, which remains fitted upon the axle. Another wheel tire and body provided with a precisely similar socket is then fitted upon the central boss a, and fixed in its place by the bolts or studs p. The tire and outer part of the wheel can in this way be removed over and over again without difficulty and very quickly, while the central boss a and its dust-excluding devices (which form the most expensive part of the wheel) remain unaffected, and are capable of lasting well while many of the external wheels and tires are replaced when worn out.

What I claim as my invention, and desire to secure by Letters Patent, is—

1. The combination with the ring c formed in segments, and the spring d, the pins f fixed to the rings c and fitting in recesses in the boss of the loose wheel, substantially as set forth.

2. In a combined dust-excluder and boss for car-wheels, the combination with the rings c formed in segments and the spring d; the pins f fixed to the rings c and fitting in recesses in the boss of the loose wheel; the boss a provided with a hollow central portion l and the brackets s, the collar n made integral with the wheel and turned to fit the boss; the T-headed bolts p adapted to pass through the brackets of the boss and into the aforesaid collar, the flanged head g bolted to the inside end of the boss a; the collar made integral with the axle and adapted to fit between the head g and the end of the boss, and two metallic plates e held against the outside faces of the rings c, substantially as described.

In testimony whereof I have hereunto set my hand in the presence of two witnesses.

THOMAS MILLER. [L. S.]

Witnesses:
ROBT. THOMSON,
ROBT. TAYLOR.